United States Patent [19]

Kishi et al.

[11] Patent Number: 4,925,468
[45] Date of Patent: May 15, 1990

[54] FILTER DEVICE PROVIDED IN AN AIR CONDITIONING DEVICE

[75] Inventors: Noriaki Kishi, Kariya; Kazuto Nosaka, Chita; Tadayoshi Terao; Yukio Shibata, both of Kariya, all of Japan

[73] Assignee: Nippondenso Co., Ltd., Kariya, Japan

[21] Appl. No.: 253,697

[22] Filed: Oct. 5, 1988

[30] Foreign Application Priority Data

Oct. 14, 1987 [JP] Japan .................. 62-259329

[51] Int. Cl.$^5$ .................. B01D 46/12; B01D 35/02
[52] U.S. Cl. .................. 55/467; 55/480; 55/481; 55/483; 55/497; 55/509; 55/513; 55/DIG. 13
[58] Field of Search .......... 55/387, 480–484, 55/495, 497, 506, 509, 513, 523, DIG. 13, 467

[56] References Cited

U.S. PATENT DOCUMENTS

| 1,887,737 | 11/1932 | Shurtleff | 55/481 X |
| 2,013,038 | 9/1935 | Dollinger | 55/484 |
| 2,057,568 | 10/1936 | Gerard | 55/481 |
| 2,107,653 | 2/1938 | Strobell | 55/481 X |
| 2,201,628 | 5/1940 | McCormick et al. | 55/497 X |
| 2,655,091 | 10/1953 | Geiger | 55/481 X |
| 3,149,942 | 9/1964 | Finch | 55/495 |
| 3,494,113 | 2/1970 | Kinney | 55/481 |
| 3,624,161 | 11/1971 | Bub | 55/497 X |
| 3,941,034 | 3/1976 | Helwig et al. | 55/484 X |
| 4,153,505 | 5/1979 | Ferguson | 55/DIG. 13 |
| 4,171,210 | 10/1979 | Miller | 55/506 X |
| 4,200,444 | 4/1980 | Witchell | 55/484 |
| 4,401,447 | 8/1983 | Huber | 55/482 X |
| 4,402,717 | 9/1983 | Izumo et al. | 55/390 X |
| 4,484,938 | 11/1984 | Okamoto et al. | 55/387 X |

FOREIGN PATENT DOCUMENTS

| 0250469 | 10/1987 | German Democratic Rep. | 55/483 |
| 59-089937 | 5/1984 | Japan | 55/495 |
| 60-232225 | 10/1985 | Japan | 55/495 |
| 748901 | 5/1956 | United Kingdom | 55/481 |

Primary Examiner—Robert Spitzer
Attorney, Agent, or Firm—Cushman, Darby & Cushman

[57] ABSTRACT

A filter device having a plurality of filter elements and at least one flexible joint connecting the filter elements to each other. The filter elements are made of a substantially inflexible material and have connecting surfaces in parallel with a direction of air flowing through a passage in which the filter device is provided. One end of the flexible joint is connected to the connecting surface of one of the filter elements, and the other end of the flexible joint is connected to the connecting surface of the filter element adjacent thereto.

6 Claims, 6 Drawing Sheets

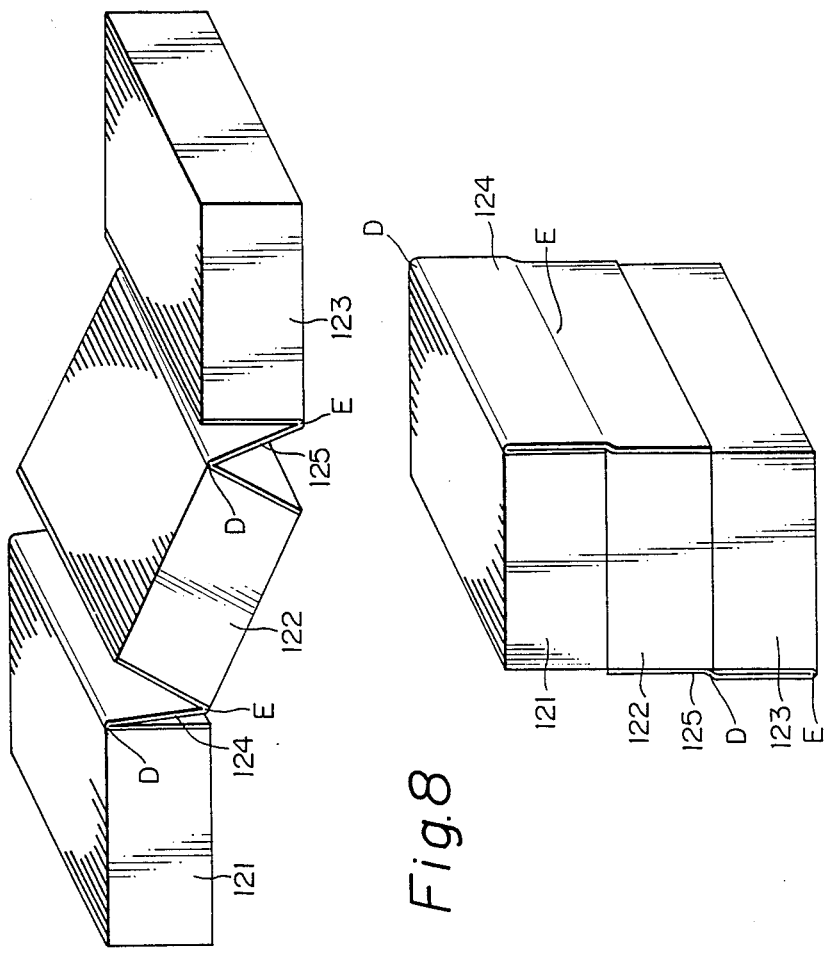

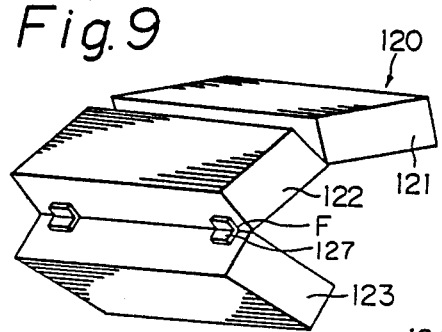
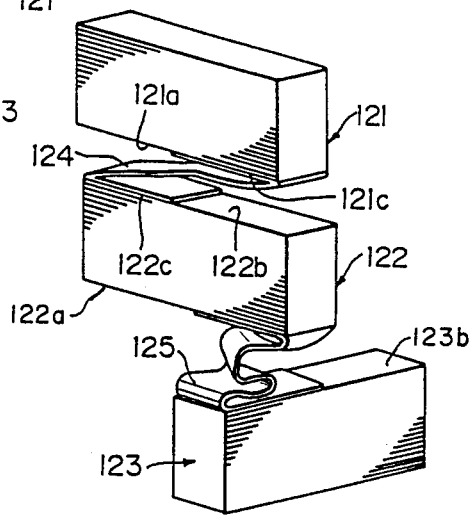
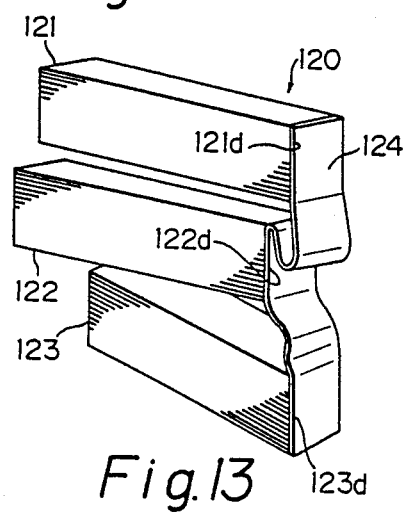
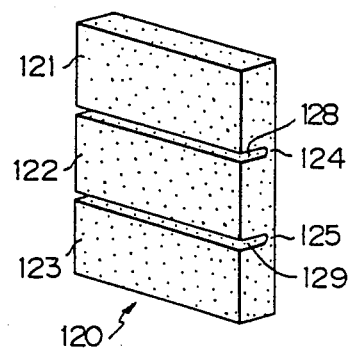
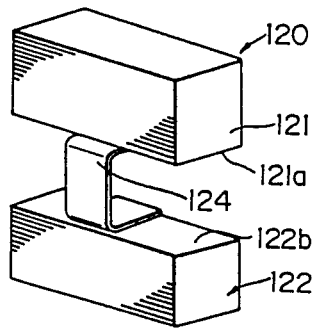

1

FILTER DEVICE PROVIDED IN AN AIR CONDITIONING DEVICE

BACKGROUND OF THE INVENTION

1. Field of the Invention

The present invention relates to a filter device provided in an air passage of an air conditioning device for removing foreign matter from air flowing through the air passage.

2. Description of the Related Art

Conventionally, many kind of filter devices are used for domestic air conditioning devices or vehicle air conditioning devices. For example, a filter device shown in Japanese Unexamined Patent Publication No. 59-89937 has plate-shaped filter elements connected by a hinge and able to bend relative to each other, so that the filter elements can be easily inserted in the air conditioning device.

Since the conventional filter element is made of, for example, a non-woven fabric, the filter element is not stiff, and therefore, a frame must be provided enclosing the periphery of the filter element, to maintain a predetermined shape thereof. Such a frame, however, increases a resistance to an air flow passing through the filter element, and further, the hinge member used for connecting the filter elements also causes an increase of the air flow resistance.

SUMMARY OF THE INVENTION

An object of the present invention is to provide a filter device in which filter elements are easily inserted, and which will provide a low resistance to air flowing therethrough.

According to the present invention, there is provided a filter device for removing foreign matter from air flowing through an air passage; the device comprising a filter and at least one connecting member. 4

The filter comprises a plurality of filter element made of a substantially inflexible material, and each filter element has at least one connecting surface in parallel with a direction of flow of the air and is disposed in the air passage in such a manner that each of the at least one connecting surfaces are in parallel with each other. The at least one connecting member connects connecting surfaces of two filter elements in such a manner that adjacent filter elements are movable relative to each other.

BRIEF DESCRIPTION OF THE DRAWINGS

The present invention may be more fully understood from the description of preferred embodiments of the invention set forth below, together with the accompanying drawings, in which:

FIG. 7 is a perspective view of a filter device of a third embodiment of the present invention;

FIG. 8 is a perspective view of the filter device of the third embodiment, showing the flexible joints bent so that the filter elements are stacked one upon the other;

FIG. 9 is a perspective view of a filter device of a fourth embodiment of the present invention;

FIG. 10 is a perspective view of a filter device of a fifth embodiment of the present invention;

FIG. 11 is a perspective view of a filter device of a sixth embodiment of the present invention;

FIG. 12 is a perspective view of a filter device of a seventh embodiment;

FIG. 13 is a perspective view of a filter device of an eighth embodiment of the present invention;

DESCRIPTION OF THE PREFERRED EMBODIMENTS

The present invention is described below with reference to the drawings showing embodiments of the present invention.

In an air conditioning device provided for a vehicle, foreign matter and exhaust gases often enter a room of the vehicle through an air conditioning device with the air conditioning device is controlled to provide fresh air, and this causes discomfort to riders in the vehicle. Also such foreign matter will adhere to an evaporator of the air conditioning device, and will be the cause of offensive odors when air is circulated inside the room. In some embodiments of the present invention, a honeycomb type filter is provided upstream of the evaporator installed in the air conditioning device, to prevent such offensive odors and to prevent an adherence of foreign matter or particles to the evaporator.

Figure 1:
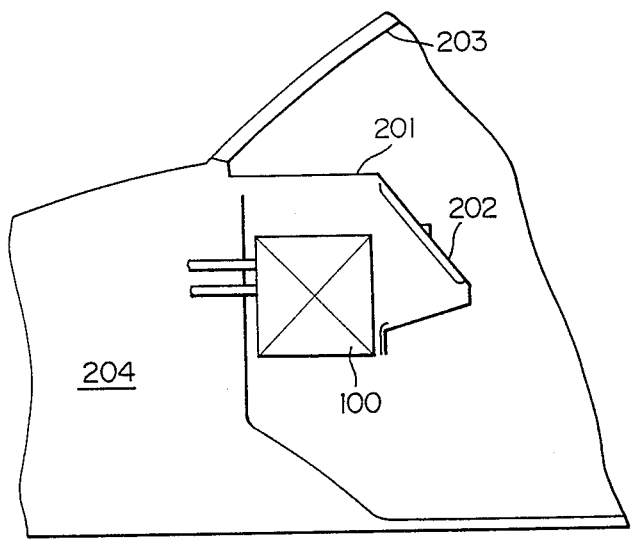
FIG. 1 is a diagrammatic sectional view showing an air conditioning device when mounted on a vehicle.

FIG. 1 shows an air conditioning device 100 mounted on a vehicle. The air conditioning device 100 is generally provided in a dash board 201, close to a glove box 202 Note, reference numerals 203 and 204 show a front glass and an engine room, respectively.

Figure 2:
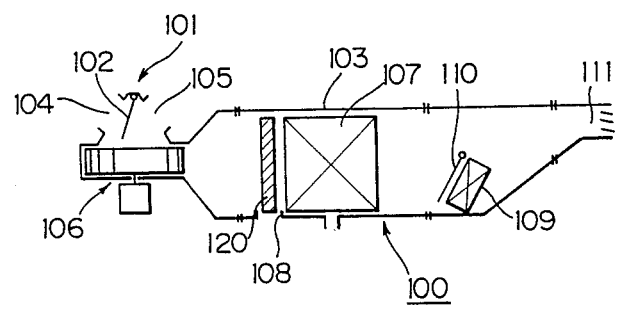
FIG. 2 is a diagrammatic sectional view of the air conditioning device of FIG. 1.

FIG. 2 shows a general construction of the air conditioning device 100. An air inlet door device 101 is provided with a valve 102 for selectively feeding air into a duct 103 through an outside aperture 104 opening to the outside or an inside aperture 105 opening to the inside of the room of the vehicle. A blower 106 is provided downstream of the air inlet door device 101, to cause an air flow in the duct 103. Namely, the duct 103 serves as an air passage for leading air from the blower 106 to the room of the vehicle. An evaporator 107 is installed in the duct 103, and a filter device 120 is provided adjacent to and upstream of the evaporator 107. An opening 108 is formed in the duct 103 for inserting the filter device 120 in the duct 103. A heater 109 is mounted downstream of the evaporator 107, and an air mix damper 110 is provided upstream of the heater 109 to control the amount of air flowing through the heater 109. An outlet 111 is formed at a position furthest downstream in the duct 103, to discharge conditioned air into the room.

Figure 3:
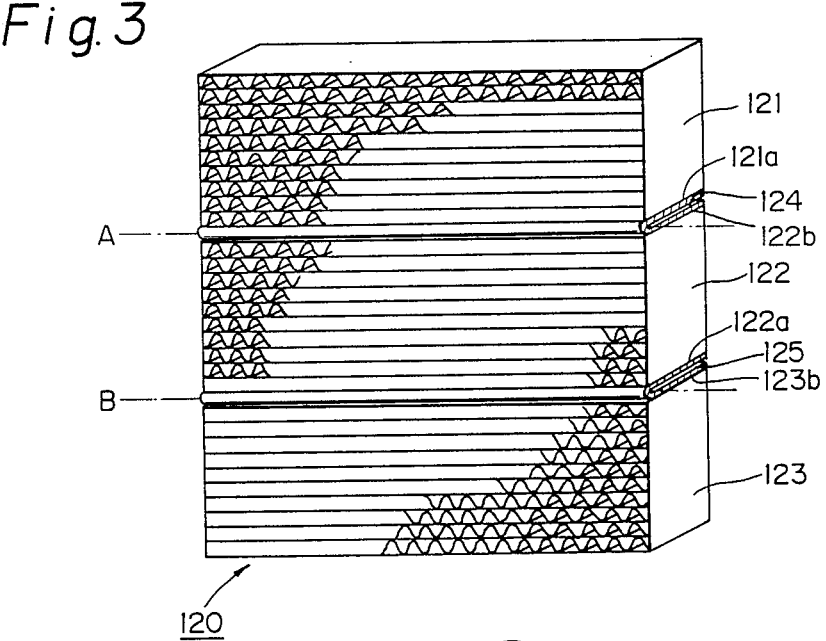
FIG. 3 is a perspective view of a filter device of a first embodiment of the present invention.

FIG. 3 shows a filter device 120 having three filter elements 121, 122, and 123 stacked one on the other.

Each filter element 121, 122, and 123 is made of corrugated board and is a parallelepiped, and further is substantially inflexible. The filter elements 121, 122, and 123 are connected by flexible joints 124, and 125 made of the same material as the filter elements 121, 122, and 123, but flexible. Namely, the flexible joints 124, and 125 are formed as thin strips, and thus are flexible. The material of the filter elements 121, 122, and 123 and the flexible joints 124, and 125 is obtained by forming an activated carbon fiber into paper, or by soaking paper with an absorbent.

In this embodiment, the flexible joints 124, and 125 are rectangular sheets having the same breadth as the filter elements 121, 122, and 123, and approximately twice the length of the filter elements 121, 122, and 123. The flexible joints 124 and 125 are bent at the center lines A and B, respectively, extending along the breadth direction to be adhered to connecting surfaces 121a, 122b, 122a, 123b, respectively, by an adhesive. Accordingly, the filter elements 121, 122, and 123 are able to rotate relative to each other about the center lines A and B.

The filter device 120 is disposed in the duct 103 in such a manner that the connecting surfaces 121a, 122b, 122a, 123b are in parallel with each other, and are in parallel with a direction of flow of air passing through the duct 103.

Figure 4:
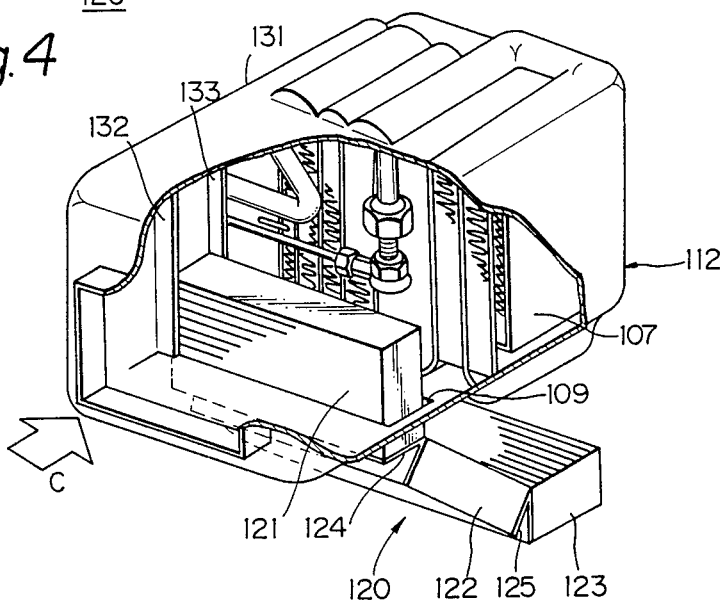
FIG. 4 is a partially cutaway view in perspective of an evaporator installed in the air conditioning device shown in FIG. 2.

FIG. 4 shows a partially cutaway view of an evaporator unit 112. A casing 131 of the evaporator unit 112 is a part of the duct 103 shown in FIG. 1, and is provided with an opening 109 having substantially the same rectangular shape as that of the top surface of each filter element 121, 122, and 123. Two guide plates 132 and 133 are provided on an inner wall of the casing 131, extending vertically and in parallel with each other. The distance between the two guide plates 132, and 133 is slightly larger than the thickness of the filter elements 121, 122, and 123.

The filter device 120 is bent at the flexible joints 124 and 125, as shown in FIG. 4, and inserted in the casing 131 through the opening 109. While the filter elements 121, 122, and 123 are being inserted in the casing 131 and moved upward therein, side portions of the elements 121, 122, and 123 are successively guided by these guide plates 132 and 133. When the filter device 120 is housed in the casing 131, the adjacent connecting surfaces 121a, 122b, 122a, and 123b (FIG. 3) face each other. Note, in this drawing, an arrow C denotes an air flow direction.

Each filter element 121, 122, and 123 of the filter device 120 has a breadth extending vertical to the horizontal plane, this breadth being less than a height of the insertion and removal space located in the room of the vehicle and below the opening 109. Therefore, even if the height of this space is relatively small, the filter device 120 can be easily inserted in the casing 131, and removed therefrom, by bending the device 120 at the flexible joints 124 and 125.

Figure 5:
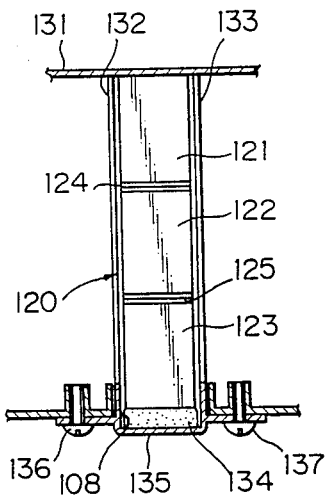
FIG. 5 is a sectional view of the filter device installed in a casing of the evaporator of FIG. 4.

After the filter device 120 is inserted, as shown in FIG. 5, a sponge member 134 is disposed on the bottom portion of the bottom-most filter element 123, and then a cover 135 is placed on the bottom of the casing 131 to close the opening 109, and is fixed thereby screws 136 and 137 while compressing the sponge member 134.

According to this embodiment, the filter device can be bent at the flexible joints 124, and 125, and therefore, even if a vehicle has a very narrow space for inserting the filter device 120 into the casing 131, the filter device 120 can be easily inserted in the casing 131 by bending the device 120 at the joints 124 and 125. Further, even in such a situation, a honeycomb type filter having a very low air flow resistance can be used for the filter elements 121, 122, and 123. Note that, since the flexible joints 124 and 125 are folded almost flat when the filter device 120 is housed in the casing 131, the flexible joints 124 and 125 have very little affect on the flow resistance.

Figure 6:
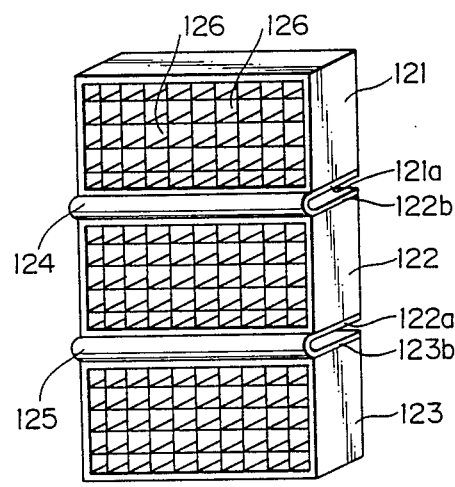
FIG. 6 is a perspective view of a filter device of a second embodiment of the present invention.

FIG. 6 shows a second embodiment of the present invention. In this embodiment, the filter elements 121, 122, and 123 are made of a sintered porous material which has been soaked with an activated carbon or absorbent, and which has air passages 126 having a square section. The connecting surface 121a of the filter element 121 and the connecting surface 122b of the filter element 122 are connected by the flexible strip 124, and the connecting surface 122a of the filter element 122 and the connecting surface 123b of the filter element 123 are connected by the flexible strip 125. These flexible strips 124, and 125 are made of, for example, a cloth.

FIGS. 7 and 8 show a third embodiment of the present invention. FIG. 7 shows the filter device 120 when not housed in the casing 131 (FIG. 4). The flexible joints 124 and 125 are bent into three folds to be connected to the filter elements 121, 122, and 123. Namely, the flexible joints 124, and 125 are rectangular strips having the same breadth as the filter elements 121, 122, and 123, and are approximately three times as long as the filter elements 121, 122, and 123. The flexible joints 124, and 125 can be bent at the portions D and E, which coincide with sides of the filter elements 121, 122, and 123.

FIG. 8 shows the flexible joints 124, and 125 when folded so that the filter elements 121, 122, and 123 are stacked one on the other. In the flexible joint 124, the portion D is bent and the portion E is flattened, and in the flexible joint 125, the portion E is bent and the portion D is flattened. According to this third embodiment, the degree of freedom of folding the flexible joints 124 and 125 is increased, in comparison with the first and second embodiments, so that the filter device 120 can be compactly arranged when stored and damage to the honeycombed face is prevented.

FIG. 9 shows a fourth embodiment, in which the filter elements 121, 122, and 123 are connected by a hinge 127 so that each filter element can rotate relative to the filter element adjacent thereto. The hinge 127 is a small piece of a flexible material, such as a plastic material, and easily bent at a fold F, or is composed of two small plates joined to each other by a pin in such a manner that the plates rotate around the pin. In this construction, since the breadth of the hinge 127 is smaller than the breadth of the filter elements 121, 122, and 123, the resistance to an air flow passing through the filter device 120 is lower than in the first, second, and third embodiments.

FIG. 10 shows a fifth embodiment, in which the filter elements 121, 122, and 123 are connected by flexible strips 124 and 125, which extend along the breadth of the filter elements. One end of the flexible strip 124 is connected to a first end portion 121c of the connecting surface 121a of the filter element 121, and the other end of the flexible strip 124 is connected to a second end portion 122c of the connecting surface 122b of the filter element 122. The connecting surface 121a faces the connecting surface 122b, and the first end portion 121c is located at the opposite side of the second end portion 122c, in a usual state. The flexible strip 125 is connected to the connecting surfaces 122a and 123b in the same way as the flexible strip 124.

According to the fifth embodiment, the degree of freedom of the filter elements 121, 122, and 123 is further increased, in comparison with the above embodiments, and thus the filter device 120 of the fifth embodiment can be more easily inserted in the casing of the air conditioning device.

FIG. 11 shows a sixth embodiment, in which the filter elements 121, 122, and 123 are connected by a single flexible strip 124 which extends along the height direction of the filter elements. In this embodiment, the filter elements 121, 122, and 123 are aligned in such a manner that side faces 121d, 122d, and 123d of the filter elements are on the same plane when the filter device 120 is housed in the casing 131 (FIG. 4). The flexible strip 124 is adhered to the side faces 121d, 122d, and 123d; i.e., the side faces serve as the connecting surfaces.

The filter elements 121, 122, and 123 of this embodiment can be freely displaced relative to each other, as in the above described embodiments, so that the filter device 120 can be easily inserted in the casing 131. Further, the flexible strip 124 of this embodiment can be housed between the filter device 120 and the inner wall of the casing, so that the flexible strip 124 will not increase the air flow resistance.

FIG. 12 shows a seventh embodiment, in which a flexible strip 124 is provided between the connecting surface 121a of the filter element 121 and the connecting surface 122b of the filter element 122. One end of the flexible strip 124 is connected to a middle portion of the connecting surface 121a, and the other end of the flexible strip 124 is connected to a middle portion of the connecting surface 122b facing the connecting surface 121a. In this embodiment also, the filter elements 121, 122, 123 can be freely rotated and twisted as in the above described embodiments, so that the filter device 120 can be easily inserted in the casing 131 (FIG. 4). Further, the flexible strip may be smaller than that used in the embodiments shown in FIGS. 3, 6, 7, 8, 10, and 11, so that the air flow resistance is further lowered.

FIG. 13 shows an eighth embodiment of the present invention. In this embodiment, the filter elements 121, 122, and 123 composing the filter 120 are made of a synthetic sponge material such as polyurethane, and the flexible joints 124 and 125 are not strips but are an integral part of the filter 120, and thus also made of a synthetic sponge material such as polyurethane. Namely, the filter elements 121, 122, and 123 and the flexible joints 124 and 125 are formed as one body, i.e., the filter device 120 is formed by cutting slits 128 and 129, having a predetermined depth, to form the flexible joints 124 and 125 between the filter members 121, 122 and 123.

When the filter device 120 is installed in the casing 131, the flexible joints 124, and 125 are compressed and become very thin, and therefore, the air flow resistance is not increased thereby.

Figure 14:
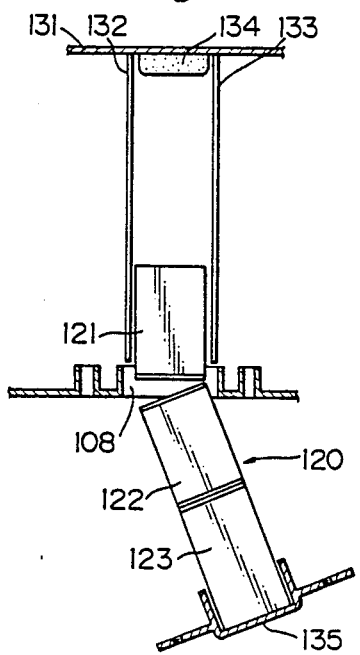
FIG. 14 is a sectional view showing a filter device when inserted in a casing of an evaporator.
Figure 15:
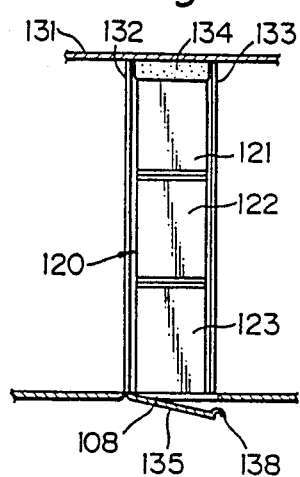
FIG. 15 is a sectional view showing a filter device installed in the casing.

In the embodiment shown in FIG. 5, the sponge member 134 provided for fixing the filter device 120 to the casing 131 of the air conditioning device is attached to the cover 135, as shown in FIG. 14, but this sponge member 134 may be mounted on an upper wall of the casing 131 of the air conditioning device before fixing the cover 135 to the opening 108. Further, in another embodiment, the sponge member 134 may be attached on a top end face or bottom end face of the filter device 120.

The cover 135 for fixing the filter device 120 to the casing 131 may be formed integrally with the casing 131, and provided with a projection 138 which engages with a periphery of the opening 108 to enable the opening 108 to be a opened and closed by a snap action.

Figure 16:
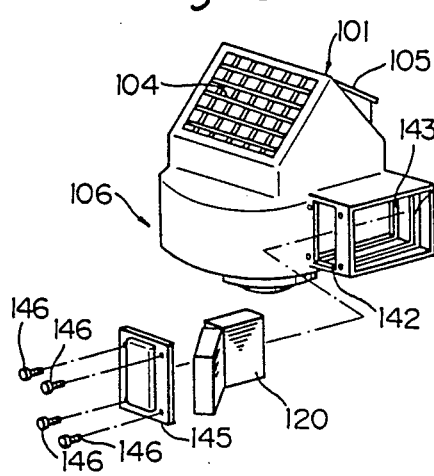
FIG. 16 is a perspective view showing a filter device mounted on an outlet of a blower; and, FIG. 17 is a sectional view showing a filter device mounted on an outlet of an air conditioning device.
Figure 17:
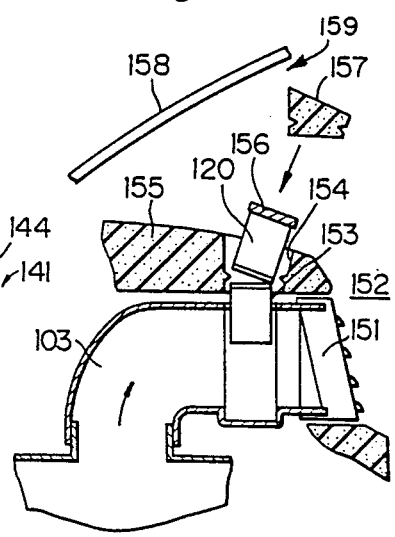

In the embodiments described above, the filter device 120 is provided upstream of the evaporator 107, as shown in FIGS. 16 and 17, but the filter device 120 may be also provided in an outlet of the blower 106 or the outlet 111 from which conditioned air is discharged to the room of the vehicle.

FIG. 16 shows an embodiment in which the filter device 120 is mounted in the outlet 141 of the blower 106. As shown in the Fig., an inserting mouth 142 is formed in a side wall of the outlet 141 and guide plates 143 and 144 are provided on the opposite wall and floor of the outlet 141. The filter device 120 is inserted through the mouth 142 and engaged with and guided by the guide plates 143 and 144, and a cover 145 is fitted over the mouth 142 and fixed there by screws 146, to fix the filter device 120 in the outlet 141.

FIG. 17 shows an embodiment in which the filter device 120 is provided upstream of and adjacent to the outlet 151 of the air conditioning device. The outlet 151 is provided at a point farthest downstream of the duct 103 and faces the room 152 of the vehicle. Openings 153 and 154 for inserting the filter device 120 in the duct 103 are formed in an upper wall of the duct 103 and an upper wall of a dash board 155, respectively. A sponge member 156 is provided on a top surface of the filter device 120, and a cover 157 is inserted in the opening 154 to close the openings 153 and 154. The filter device 120 and the cover 157 are inserted in the openings 153 and 154 through a space 159 formed between a front glass 158 of the vehicle and the upper portion of the dash board 155.

Each filter element of the filter device 120 has a breadth extending vertical to the horizontal plane, the breadth being less than a height of the space 159 between the front glass 158 and the upper wall of the dash board 155. Therefore, even if the height of the space 159 is relatively small, the filter device 120 can be easily inserted in the duct 103, and removed therefrom, by bending at the connecting member 124 provided between the filter elements.

Note that the filter device 120 may be provided in an inlet for recirculation air in the room, an inlet for feeding fresh air into the room, or used as a filter in an air purification device of a vehicle.

According to the embodiments of the present invention, since the filter elements are stiff, a frame for supporting the filter elements need not be provided, and thus an air flow resistance is generated only by the filter elements. Since a plurality of filter elements are connected by the flexible joints provided between the filter elements, and stacked one on the other in the casing, the insertion and removal of the filter device 120 is easily accomplished since each filter element can be inserted or removed individually. Further, the space allowed for handling the filter elements can be made smaller than the space needed for handling a filter device which is a solid block, and therefore, the degree of freedom when locating the filter device is increased.

Further, since the flexible joints are provided in parallel with the air flow direction when the filter elements are stacked one on the other, very little resistance to the air flow is produced by the flexible joints.

Although the embodiments of the present invention have been described herein with reference to the attached drawings, many modifications and changes may be made thereto by those skilled in this art without departing from the scope of the invention.

We claim:

1. An air conditioning device for a vehicle, said air conditioning device causing air to be supplied by a blower into a room of said vehicle, and having a filter device for removing foreign matter from air flowing through an air passage, said air conditioning device comprising:

a duct serving as said air passage and leading said air from said blower to said room, said duct being provided with an opening for inserting said filter device therein, and a cover for closing said opening, said filter device including a filter and at least one connecting member, said filter having a plurality of filter elements, each filter element having at least one connecting surface in parallel with a flow direction of said air, and being disposed in said air passage in such a manner that said at least one connecting surface of each said filter element is in parallel with a connecting surface of a next adjacent filter element, at least one connecting member connecting said at least one connecting surface of each said filter element to said next adjacent filter element in such a manner that each pair of adjacent filter elements are movable relative to each other, at least one connecting member being folded between said connecting surfaces of the adjacent filter elements which are in parallel with each other.

2. An air conditioning device according to claim 1, wherein said opening is formed in a lower wall of said duct.

3. An air conditioning device according to claim 2, wherein said each filter element has a breadth extending vertical to the horizontal plane, said breadth being less than a height of a space in said room and below said opening.

4. An air conditioning device according to claim 1, wherein said opening is formed in an upper wall of said duct.

5. An air conditioning device according to claim 4, wherein said each filter element has a breadth extending vertical to the horizontal plane, said breadth being less than a height of a space in said room and above said opening.

6. A filter device according to claim 1, wherein each of said filter elements is formed by stacking corrugated boards, the elements being stacked in a direction transverse to the direction of the flow of said air, said at least one connecting member having flat portions extending along the entire width and length of the connecting surfaces of the adjacent filter element, and a folded portion arranged between said flat portions for connecting said flat portions to each other so that adjacent filter elements are stacked in parallel to each other and parallel to the direction of the flow of said air.

* * * * *

UNITED STATES PATENT AND TRADEMARK OFFICE
CERTIFICATE OF CORRECTION

PATENT NO. : 4,925,468

DATED : May 15, 1990

INVENTOR(S) : Noriaki KISHI, Kazuto NOSAKA, Tadayoshi Terao, Yukio SHIBATA

It is certified that error appears in the above-identified patent and that said Letters Patent is hereby corrected as shown below:

TITLE PAGE
The priority data should read as follows:
[30]     Foreign Application Priority Data
  Oct. 14, 1987 [JP]     Japan .............. 62-259329
  Aug. 29, 1988 [JP]     Japan .............. 63-214588

Signed and Sealed this

Twenty-third Day of July, 1991

Attest:

HARRY F. MANBECK, JR.

*Attesting Officer*     *Commissioner of Patents and Trademarks*